United States Patent

Hoki

[11] Patent Number: 5,774,574
[45] Date of Patent: Jun. 30, 1998

[54] PATTERN DEFECT DETECTION APPARATUS

[75] Inventor: Tetsuo Hoki, Kyoto, Japan

[73] Assignee: Dainippon Screen Mfg. Co., Ltd., Japan

[21] Appl. No.: 563,684

[22] Filed: Nov. 28, 1995

[30] Foreign Application Priority Data

Nov. 30, 1994 [JP] Japan ................................. 6-296448

[51] Int. Cl.$^6$ ................................................. G06K 9/00
[52] U.S. Cl. .......................... 382/149; 382/141; 382/173; 348/129
[58] Field of Search ..................... 382/144, 145, 382/147, 149, 151, 141, 173, 199, 209, 218, 286; 348/125–126, 129–130

[56] References Cited

U.S. PATENT DOCUMENTS

| | | | |
|---|---|---|---|
| 5,146,509 | 9/1992 | Hara et al. | 382/149 |
| 5,479,537 | 12/1995 | Hamashima et al. | 382/266 |
| 5,537,487 | 7/1996 | Miyajima et al. | 382/144 |
| 5,574,800 | 11/1996 | Inoue et al. | 382/149 |

FOREIGN PATENT DOCUMENTS 6- 21769   3/1994   Japan .

*Primary Examiner*—Leo Boudreau
*Assistant Examiner*—Bhavesh Mehta
*Attorney, Agent, or Firm*—Ostrolenk, Faber, Gerb & Soffen, LLP

[57] ABSTRACT

In a printed substrate inspection apparatus for dividing an inspection objective image into divided areas and comparing divided areas with a plurality of reference images which are included in a standard pattern image, an affect of a positional deviation of the inspection objective image is obviated. A size K of each inspection objective divided area is determined in such a manner that a difference between a positional deviation within each inspection objective divided area and a positional deviation of the inspection objective image does not exceed a quantity corresponding to 1 pixel. Further, a maximum shifting quantity M of the reference images with respect to each inspection objective divided area is set equal to or larger than a positional deviation maximum value of the inspection objective image. A positional deviation of the inspection objective image as a whole does not manifests itself as an inclination or a distortion within each inspection objective divided area. The plurality of reference images include images which correspond to images of the inspection objective divided areas. Hence, comparison inspection is accurate.

10 Claims, 9 Drawing Sheets

GENERAL EXAMPLE:
- ▨ = INSPECTION OBJECTIVE IMAGE
- ▧ = STANDARD PATTERN IMAGE
- ▩ = OVERLAPPING OF TWO IMAGES

PATTERN DEFECT DETECTION APPARATUS

BACKGROUND OF THE INVENTION

1. Field of the Invention

The present invention relates to a pattern defect inspection apparatus which is used for appearance inspection of a printed substrate or the like, and particularly to an improvement for enhancing the accuracy of detecting a pattern defect during comparison inspection.

2. Description of the Background Art

An inspection apparatus for inspecting a conductive pattern of a printed substrate is known to adopt a comparison inspection method (pattern matching method) which compares an image of an inspection objective substrate (object pattern) with a standard pattern image (master pattern) and determines whether there is a pattern defect.

While accurate alignment between an inspection objective image and a standard pattern image is demanded in such a comparison inspection method, in reality, an alignment error is still unavoidable even thorough reading an image of a printed substrate. Further, if the printed substrate itself includes a distortion, a positional relationship between the inspection objective image and the standard pattern image are locally different from each other. This is particularly problematic since the total distortion of the inspection objective image becomes larger as the printed substrate increases in size. Due to this increase in distortion, it is difficult to obtain an accurate inspection result by comparing the inspection objective image as a whole with the standard pattern image.

To deal with this, a method was developed and actually used which divides the inspection objective image into areas and compares the inspection objective image with the standard image while moving the inspection objective image with respect to a corresponding portion of the standard pattern image. Such a method is disclosed in Japanese Patent Unexamined Publication No. 6-21769, for example. According to the enclosed method, as shown in FIG. 8A, the inspection objective image I is conceptually divided into a plurality of areas (inspection objective divided areas) $\{SC_{ij}\}$ and an image $I_{ij}$ is designated for each divided area $SC_{ij}$. In addition, FIG. 8B shows a reference area $AR_o$ which corresponds to an inspection objective divided area $SC_{ij}$ and shifted areas $AR_s$ which are defined by two-dimensionally shifting by pixels the reference area $AR_o$ in the standard pattern image $I_o$. Thus, the areas $AR_o$ and $AR_s$ provide a set of a plurality of reference images {Ri+m, j+n} which is to be compared with the image of the inspection objective divided area $I_{ij}$. Although FIG. 8B shows only two shifted areas enclosed by dotted lines, in reality, a number of reference images are defined within an expanded area $EA_{ij}$ which is obtained by expanding the inspection objective divided area $SC_{ij}$ by a predetermined number of pixels upward, downward and toward right and left sides.

The divided area image $I_{ij}$ obtained in this manner is compared with each one of the reference images Ri+m, j+n. Hence, not only when the divided area image $I_{ij}$ coincides with the reference image of the standard area $AR_{ij}$ but also when the divided area image $I_{ij}$ is deviated from the standard area $AR_{ij}$ in a range which is defined by the predetermined number of pixels, it is possible to perform a comparison with the divided area image $I_{ij}$ and the corresponding standard pattern image which are aligned to each other. Further, since the divided area image $I_{ij}$ which is smaller than the entire inspection objective image I is compared even if a positional error or a distortion of the printed substrate as a whole is large, an error associated with each divided area image $I_{ij}$ is relatively small. As a result, inspection accuracy improves.

Since this method is equivalent to comparing the divided area image $I_{ij}$ with the standard pattern image $I_o$ while swaying, i.e., shifting, the divided area image $I_{ij}$ relative to the standard pattern image $I_o$ about the standard area $AR_o$, the method is hereafter referred to as the "divide and sway comparison method". The "divide and sway comparison method" has another advantage in addition to the present described method. That advantage is that only a real pattern defect is detected because each divided area image is compared with a plurality of the reference images and comparison results, as a whole, are considered. However, other methods which compare the divided area image with only one reference image cannot distinguish a real pattern defect from a minor pattern defect which creates no problem.

Since shift (sway) between the divided area image and the reference image in the "divide and sway comparison method" is of relative nature, shifting the reference image is substantially shifting the divided area image. For this reason, the subsequent description describes the swayed image as the divided area image or as the reference image depending on a purpose discussed.

As described, a positional error created during mounting of a printed substrate onto an image reading apparatus affects the reading of an image of the printed substrate. In addition, there is an error which is inherent in an image reading system of the image reading apparatus. Further, there is an error which is created by a distortion inside the printed substrate. Hence, if the size of each inspection objective divided area $SC_{ij}$ is set too large, an inclination or a distortion is created within each inspection objective divided area $SC_{ij}$ as well, which in turn makes accurate comparison inspection difficult.

On the other hand, if the size of each inspection objective divided area $SC_{ij}$ is set too small, a detection error will be created for other reasons. FIG. 9A shows a situation where such a detection error is created. In FIG. 9A, the inspection objective image I is divided into small divided area images $I_{ij}$. In the inspection objective image I of FIG. 9A, a pattern $P_b$ in the center is shorter than the other normal patterns $P_a$ and $P_c$ because of a pattern defect (indicated by the dotted line) which exists in an area where a regular pattern should be created.

The corresponding standard pattern image $I_o$ is shown by cross-hatching in FIG. 9B. If the standard pattern image $I_o$ is compared with the divided area image $I_{ij}$ as it is shifted from a reference position as indicated by arrows, the pattern $P_b$ which is shorter than a pattern of normal length coincides with the tip portion of a normal pattern $P_{bO}$. Due to this, the inspection apparatus makes a misjudgment and concludes "No Defect." This is because the divided area image $I_{ij}$ is too local and it is impossible to judge a relationship of the divided area image $I_{ij}$ and a surrounding pattern.

While detection accuracy deteriorates when the divided area image created by dividing is too large or too small, as described above, conventional techniques have failed to establish an objective criteria for determining the size of the divided area image. Hence, the inspection apparatus tends to select either too large a size or too small a size for the inspection objective divided areas. Not only does this apparatus for inspecting a printed substrate have this problem, but this problem is also true with other apparatuses which perform pattern inspection of an IC mask pattern, a lead frame, a liquid crystal display substrate, etc.

SUMMARY OF THE INVENTION

An object of the present invention is to overcome the problems of the heretofore described inspection apparatuses.

Another object of the present invention is an apparatus used in the divide and sway comparison method to inspect a pattern defect, which objectively determines the upper limit of the size of inspection objective divided areas and therefore performs accurate inspection.

A further object of the present invention is to make accurate inspection possible by appropriately determining the maximum deviation of a reference image in accordance with the size of the inspection objective divided areas once the size of the inspection objective divided areas is determined.

A first aspect of the present invention is directed to a method of detecting a defect of an objective image by comparing the objective image with a reference image, comprising the steps of: a) determining maximum whole deviation of the objective image from the reference image; b) dividing the objective image into a plurality of divided images; c) determining a part of the reference image corresponding to each divided image; d) determining a plurality of reference partial images around the part of the reference image; and e) comparing each divided image with the plurality of reference partial images to detect the defect of the objective image, wherein positional maximum intra-deviations within each divided image corresponding to the maximum whole deviation of the objective image are no larger than a pixel of the objective image, and the plurality of reference partial images are distributed from the part of the reference image over a distribution width not less than the maximum whole deviation of the objective image.

The step b) may include the steps of: b-1) designating a minimum threshold size of each divided image; and b-2) determining each size of the plurality of divided images no less than the minimum threshold size.

The plurality of divided images may have a common size.

The distribution width of the plurality of reference partial images may be twice the maximum whole deviation of the objective image.

Alternatively the step a) includes the steps of: a-1) determining maximum non-translational deviation of the objective image from the reference image, and a-2) determining maximum total deviation of the objective image from the reference image including translational deviation and non-translational deviation. The positional maximum intra-deviations within each divided image are determined as a function of the maximum non-translational deviation of the objective image, and the distribution width of the plurality of reference partial images is not less than the maximum total deviation of the objective image.

A second aspect of the present invention is directed to an apparatus for detecting a defect of an objective image by comparing the objective image with a reference image, comprising: a) dividing means for dividing the objective image into a plurality of divided images; b) first determining means for determining a part of the reference image corresponding to each divided image; c) second determining means for determining a plurality of reference partial images around the part of the reference image; and d) comparator means for comparing each divided image with the plurality of reference partial images to detect the defect of the objective image, wherein maximum whole deviation of the objective image from the reference image are predetermined, positional maximum intra-deviations within each divided image corresponding to the maximum whole deviation of the objective image are no larger than a pixel of the objective image, and the plurality of reference partial images are distributed from the part of the reference image over a distribution width not less than the maximum whole deviation of the objective image.

A minimum threshold size of each divided image may be predetermined, and each size of the plurality of divided images is no less than the minimum threshold size.

The plurality of divided images may have a common size.

The distribution width of the plurality of reference partial images may be twice the maximum whole deviation of the objective image.

Alternatively, maximum non-translational deviation of the objective image from the reference image is predetermined, maximum total deviation of the objective image from the reference image including translational deviation and non-translational deviations is also predetermined, the positional maximum intra-deviations within each divided image are determined as a function of the maximum non-translational deviation of the objective image, and the distribution width of the plurality of reference partial images is not less than the maximum total deviation of the objective image.

As described above, according to the present invention which is related to an apparatus for performing the divide and sway comparison method for pattern defect inspection, the upper limit of the size of each divided image is determined in accordance with the positional deviation maximum value of the inspection objective image. Since a positional deviation within each divided image does not exceed a quantity corresponding to 1 pixel, an accurate comparison inspection is performed without creating an inclination or a distortion on an image of the divided area.

The maximum deviation quantity of the reference images is also determined in accordance with the positional deviation maximum value of the inspection objective image. Such a positional deviation is absorbed by shifting the reference images, and therefore, the object to be inspected always includes reference images which are aligned to the images of the divided images. This allows to obtain an accurate result of comparison inspection.

Other features and advantages of the present invention will become apparent from the following detailed description of the present invention when taken in conjunction with the accompanying drawings.

BRIEF DESCRIPTION OF THE DRAWING(S)

DETAILED DESCRIPTION OF THE INVENTION

1. Overall Structure

Figure 1:
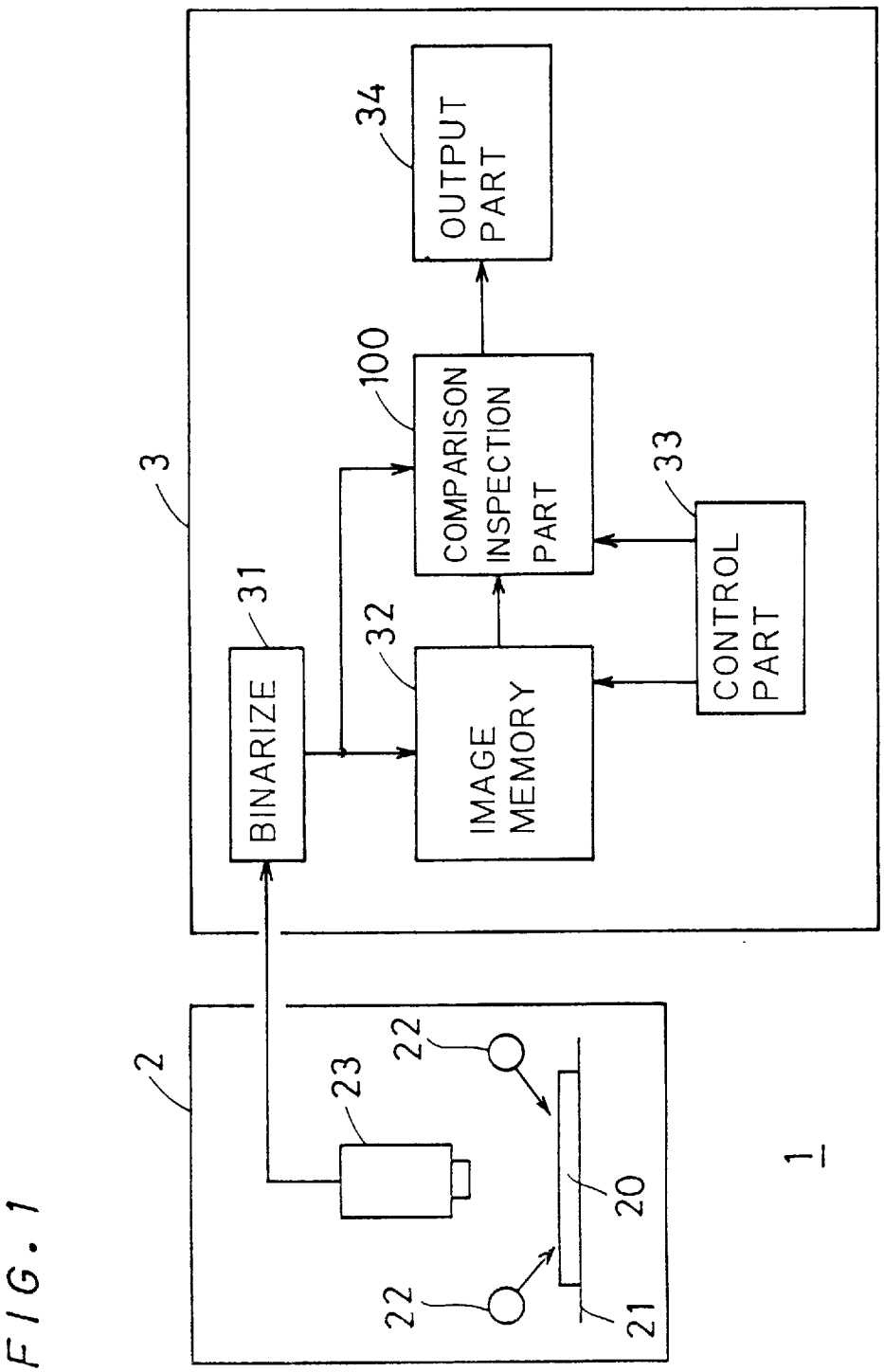
FIG. 1 is a block diagram showing a printed substrate inspection apparatus according to a preferred embodiment of the present invention.

FIG. 1 is a block diagram showing an overall structure of a printed substrate inspection apparatus 1 which is constructed as a pattern defect inspection apparatus according to a preferred embodiment of the present invention. The apparatus 1 is largely divided into an image reading part 2 and an inspection apparatus main unit 3. A printed substrate 20 is placed on a table 21 of the image reading part 2. In the printed substrate 20, a conductive pattern, a through hole and the like are formed on the substrate.

An illumination apparatus 22 irradiates the printed substrate 20 with light. Light reflected from a surface of the printed substrate 20 impinges upon a CCD image sensor 23. An image is read by scanning line-by-line while moving the image sensor 23 and the table 21 relative to each other, whereby images of a pattern formed on the printed substrate 20 is transmitted one by one from the image sensor 23 to the inspection apparatus main unit 3.

Using a predetermined threshold value, a binarizing circuit 31 of the inspection apparatus main unit 3 binarizes a signal expressing an inspection objective image inputted in this manner, and outputs a binary signal to a comparison inspection part 100. Details and operation of the comparison inspection part 100 will be described subsequently. The comparison inspection part 100 receives a signal expressing a standard pattern image which is stored in an image memory 32, and compares that signal with the signal of the inspection objective image in accordance with the "divide and sway comparison method," whereby a pattern defect of the printed substrate 20 is detected.

The standard pattern image may be an image having a pattern arrangement which is designed as a pattern on the printed substrate 20, or an image which is stored in advance by reading the image of a non-defective standard printed substrate.

The detection at the comparison inspection part 100 is provided to an output part 34 as a detection result signal indicating a result of the pattern defect detection. Receiving the detection result signal, the output part 34 displays the result of the pattern defect detection.

2. Outline of Division and Inspection at Comparison Inspection Part 100

Figure 2A:
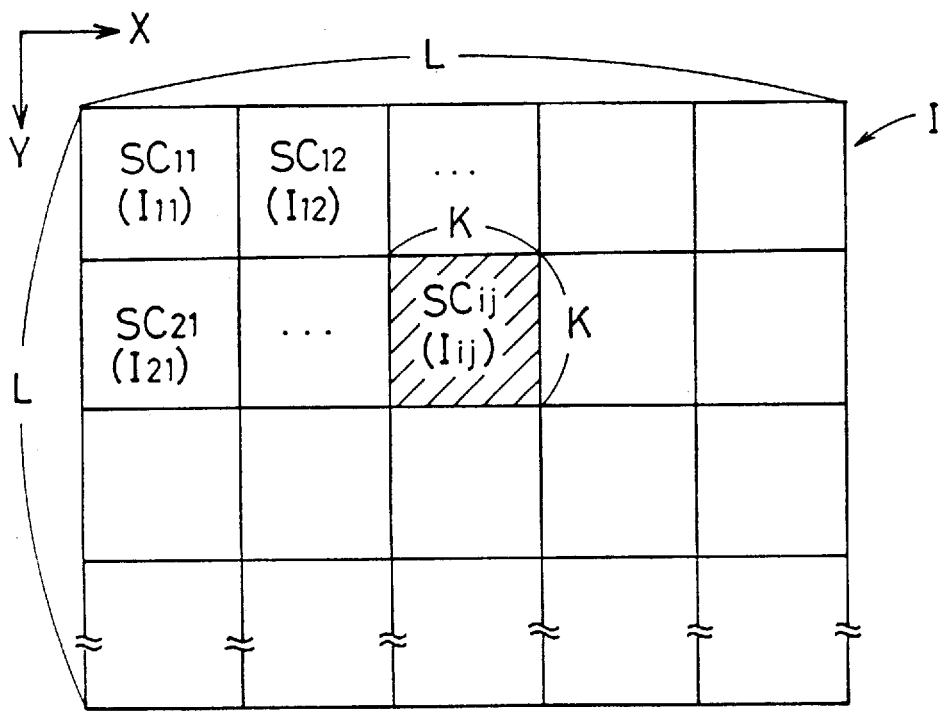
FIGS. 2A and 2B are views showing the relationship between an inspection objective image and a reference image in the preferred embodiment.
Figure 2B:
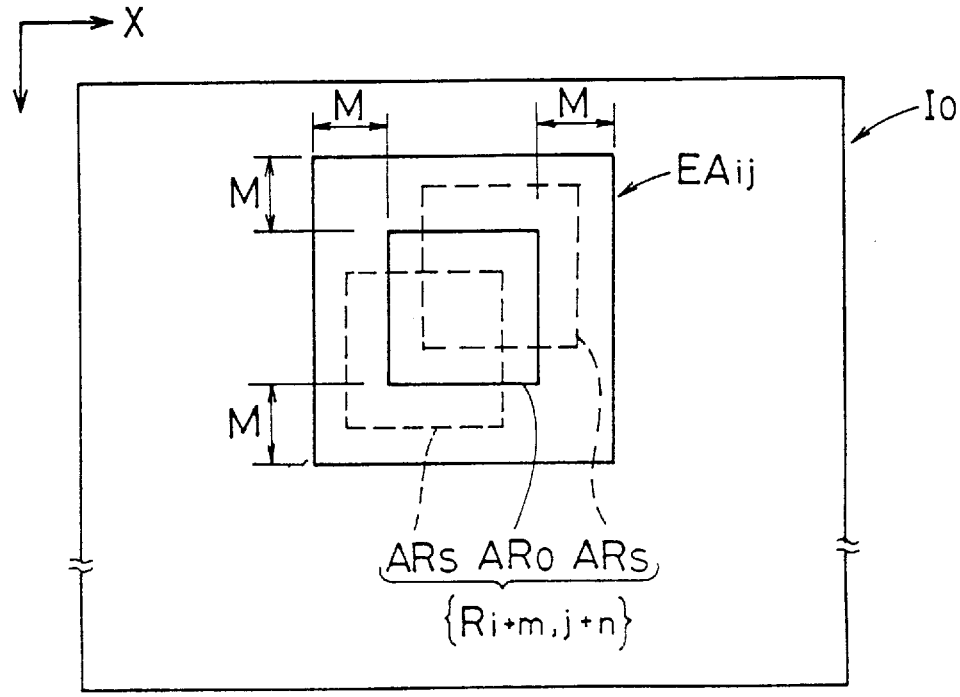
Figure 8A:
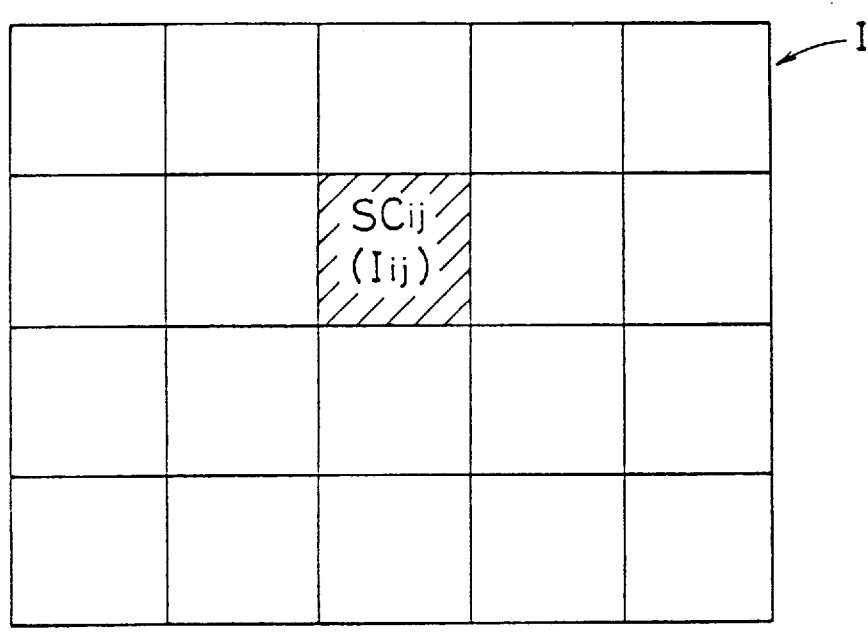
FIGS. 8A and 8B are diagrams describing the divide and sway comparison method.

FIGS. 2A and 2B are views conceptually showing principles of the divide and sway comparison method used in this embodiment. Although the illustrated basic concept is similar to that shown in FIGS. 8A and 8B, the basic concept will be described again for clear understanding of various quantities referred to in the present embodiment.

In FIG. 2A, the inspection objective image I is an image which is obtained by reading the printed substrate 20. The inspection objective image I is divided into a plurality of inspection objective divided areas $SC_{11}, SC_{12}, \ldots, SC_{ij}$ so that divided area images $I_{11}, I_{12}, \ldots, I_{ij}$ are obtained. In the present embodiment, the size of the inspection objective image I is defined by vertical and the horizontal lengths which correspond to a length L in the vertical and the horizontal direction of the printed substrate 20. The inspection objective divided areas $SC_{11}, SC_{12}, \ldots, SC_{ij}$ are each a rectangle which is defined by a length K in the vertical and the horizontal directions. The horizontal direction X in FIGS. 2A and 2B is the direction of the scanning lines in the image sensor 23, namely, a main scanning direction. The vertical direction Y in FIGS. 2A and 2B is the direction in which the image sensor 23 and the table 21 are moved relative to each other, namely, a sub scanning direction.

Figure 8B:
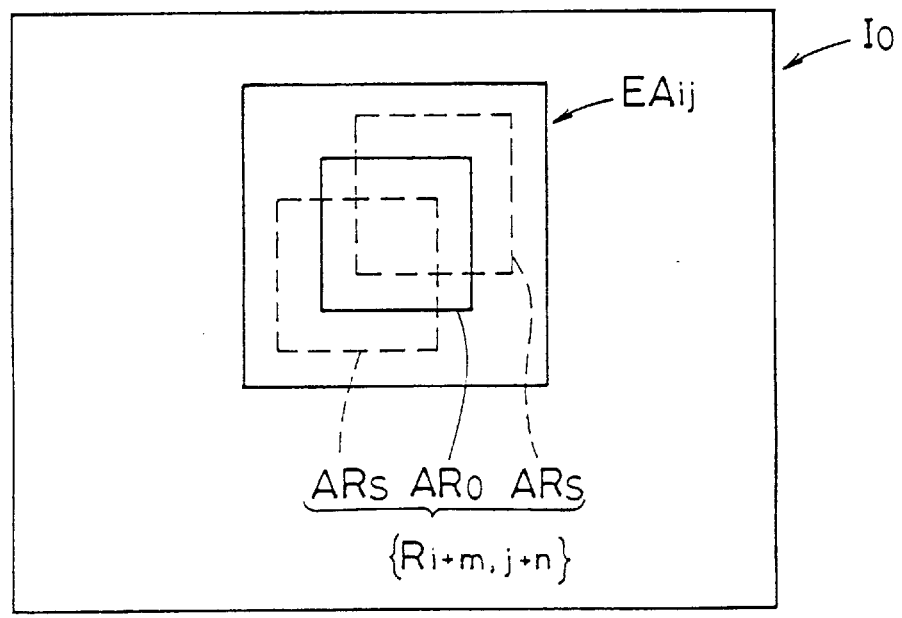

On the other hand, the standard pattern image $I_o$ is an image which is supplied from the image memory 32 of FIG. 1. FIG. 2B shows the standard pattern image $I_o$, the standard area $AR_o$ corresponding to the inspection objective divided area $SC_{ij}$ and a plurality of shifted areas $AR_s$ by pixels with the maximum shift of a value of ±M. The distance M, i.e., M=Np with N being the number of pixels and p being the pixel pitch, is an integer exceeding 0. The images of the areas $AR_o$ and $AR_s$ constitute a set of a plurality of reference images {Ri+m, j+n} which is to be compared with the image of the inspection objective divided area $I_{ij}$. Like FIG. 8B, FIG. 2B shows only two shifted areas enclosed by dotted lines. However, a number of reference images are defined within an expanded area $EA_{ij}$ which is obtained by expanding the inspection objective divided area $SC_{ij}$ by a predetermined number of pixels upward, downward and toward right and left sides in reality.

The image $I_{ij}$ obtained in this manner is compared with each one of the reference images Ri+m, j+n. The detection of a pattern defect within each divided area $SC_{ij}$ is determined by such comparison.

The size K of each one of the inspection objective divided areas $SC_{11}, SC_{12}, \ldots, SC_{ij}$, the maximum shifting quantity M of shifting the reference images and the number of pixels N defining the maximum shifting quantity M are predetermined. Calculation of these values will be described in detail later.

During the comparison between the image of the inspection objective divided area $I_{ij}$ and each one of the reference images {Ri+m, j+n}, the signals expressing the images must be aligned to each other for each pixel. On the other hand, since both the inspection objective image I and the standard pattern image $I_o$ are supplied to the comparison inspection part 100 in the order of the scanning lines, it is necessary to generate a divided area image signal and a reference image signal for each inspection objective divided area $SC_{ij}$ from input signals which are inputted in the order of the scanning lines.

Figure 3A:
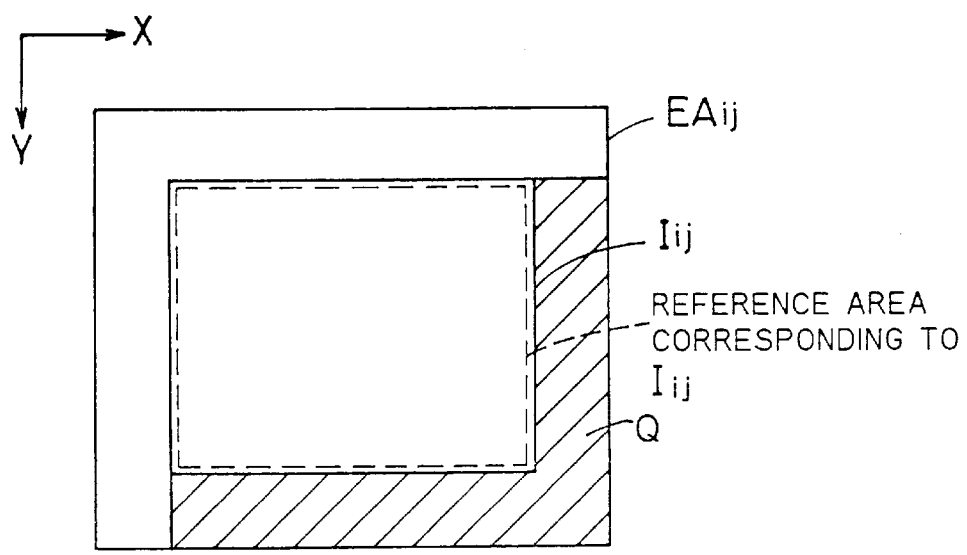
FIGS. 3A and 3B are diagrams showing principles of adjusting image data with time in the preferred embodiment.
Figure 3B:
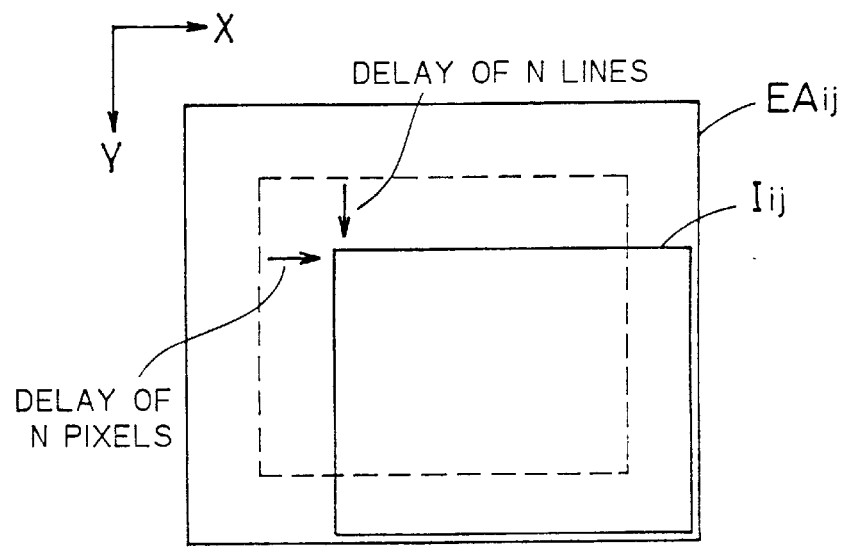

FIGS. 3A and 3B are views showing principles of this. A relationship shown in FIGS. 3A and 3B is not a relationship in terms of space but rather a relationship of the order of inputting the time. FIG. 3A represents a situation where both the inspection objective image I and the standard pattern image $I_o$ are supplied at the same timing. In this case, when the image of the inspection objective divided area $I_{ij}$ is inputted, a standard pattern image of a portion Q is not yet inputted. The portion Q is defined by coordinate points to be scanned having larger values than those of the image of the inspection objective divided area $I_{ij}$ of the expanded area $EA_{ij}$. Hence, it is impossible to compare the image of the inspection objective divided area $I_{ij}$ with the standard pattern image of the portion Q.

To deal with this, the timing of inputting the image of the inspection objective divided area $I_{ij}$ is delayed by N lines in the sub scanning direction and N pixels in the main scanning direction than the timing of inputting the standard pattern image as shown in FIG. 3B. This allows inputting of the standard pattern image of the expanded area $EA_{ij}$, which is compared with the image of the inspection objective divided area $I_{ij}$, to be completed when the image of the inspection objective divided area $I_{ij}$ is inputted. Hence, it is possible to extract the reference images of the expanded area $EA_{ij}$ and compare the image of the inspection objective divided area $I_{ij}$ with each reference image. Further, since delaying of the [???] is necessary for all inspection objective divided areas, in terms of circuit structure, the input part of the input stage of the comparison inspection part 100 for receiving the image signal of the inspection objective image should include a circuit for introducing a delay of N lines and N pixels.

Figure 4:
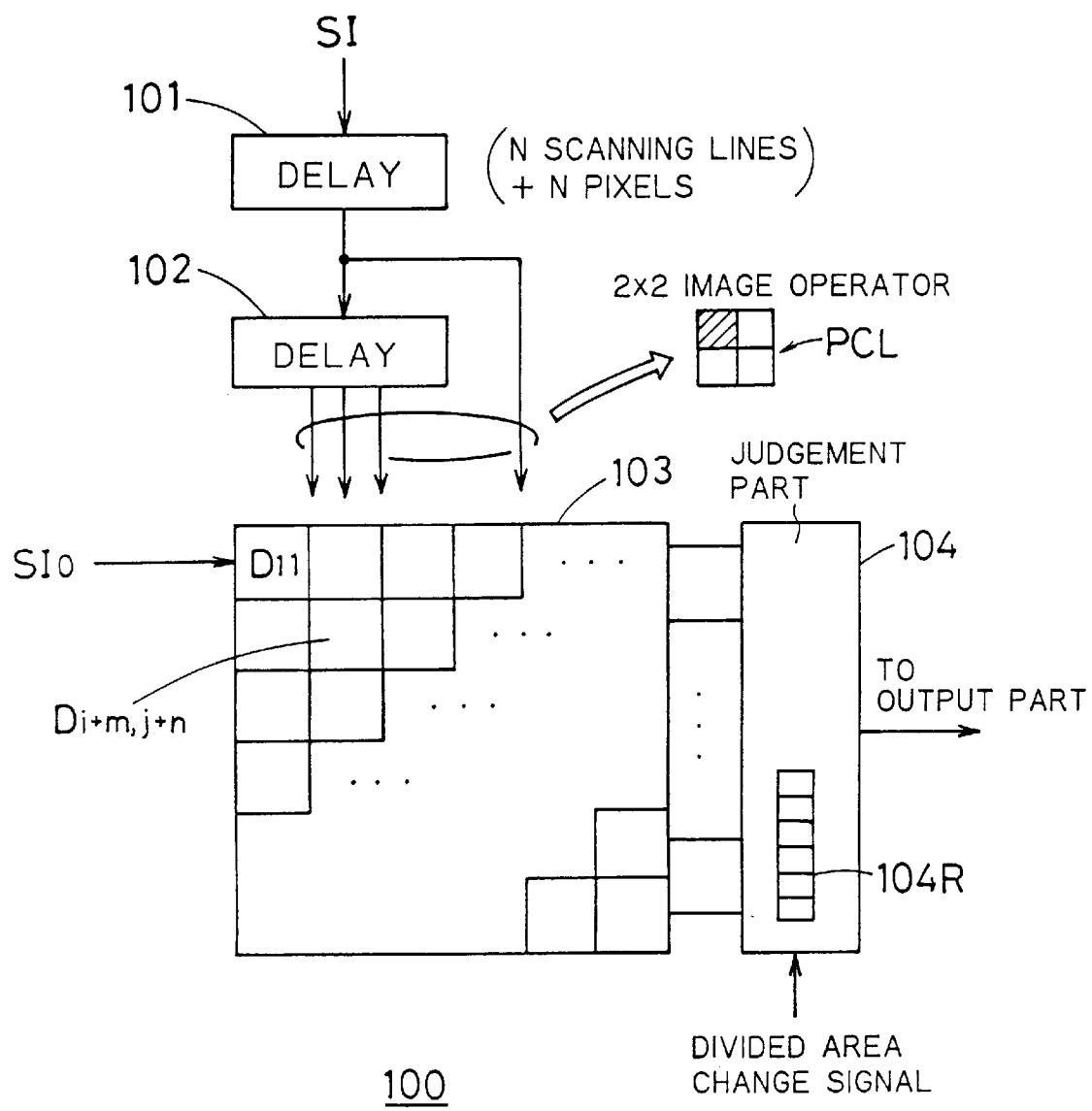
FIG. 4 is a block diagram of a comparison inspection part of the preferred embodiment.

FIG. 4 is an essential block diagram of the comparison inspection part 100 which is constructed in accordance with such principles. An inspection objective image signal SI indicating the inspection objective image I is supplied to the comparison inspection part 100. The signal SI is supplied to a delaying circuit 101 to be delayed by N lines and N pixels. The reason for introducing the delay is as described before in reference to FIGS. 3A and 3B.

The delayed signal is supplied to a next delaying circuit 102. The delaying circuit 102 delays the signal by 1 line in the sub scanning direction and 1 pixel in the main scanning direction to generate the following three types of delayed signals:

---

(Delay in Sub Scanning Direction, Delay in Main Scanning Direction)
= (0 Line, 1 Pixel),
(1 Line, 0 Pixel), and
(1 Line, 1 Pixel).
Combined with the signal before delayed, that is,
(Delay in Sub Scanning Direction, Delay in Main Scanning Direction)
= (0 Line, 0 Pixel)

--- these signals form a signal which expresses image data of a 2×2 pixel cluster (image operator) PCL as shown in FIG. 4. The signal expressing the cluster PCL is supplied to a set of comparison inspection blocks {Di+m, j+n} which are included within a comparison inspection block group 103.

A signal $SI_o$ expressing the standard pattern image is supplied to the first comparison inspection block $D_{11}$ and transmitted to comparison inspection blocks which follow and located below while delayed by 1 pixel (if in the main scanning direction) or 1 line (if in the sub scanning direction) for each block. As a result, data of the 2×2 pixel cluster of the reference images Ri+m, j+n are respectively supplied to the comparison inspection blocks Di+m, j+n.

Figure 5A:
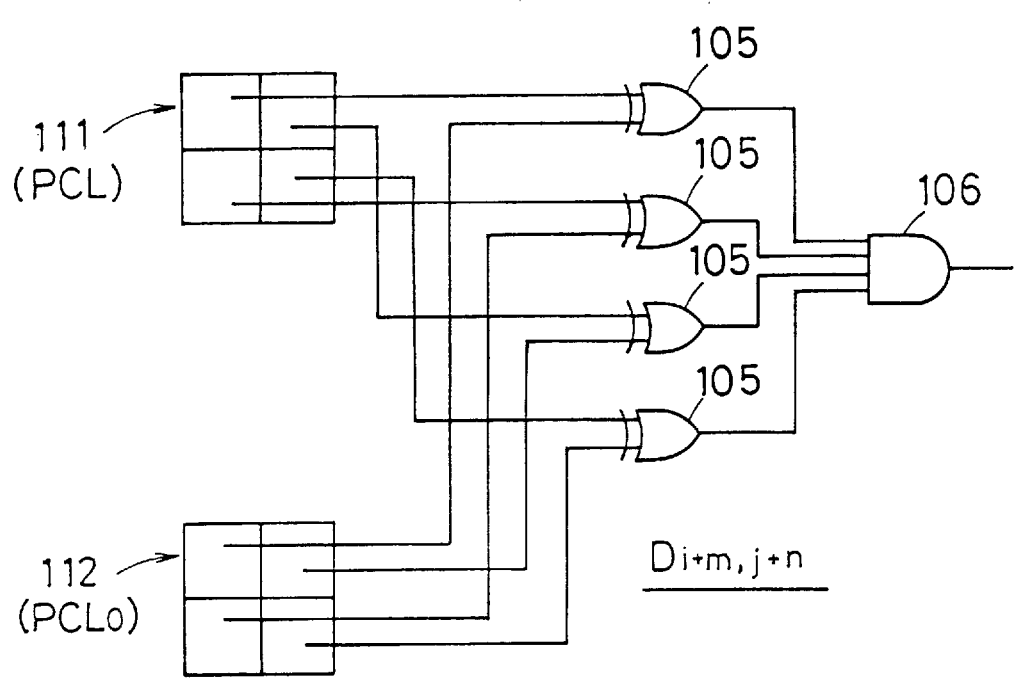
FIGS. 5A and 5B are diagrams of a comparison circuit using a 2×2 operator.

FIG. 5A is a block diagram of each comparison inspection block Di+m, j+n. Image data of the 2×2 pixel cluster PCL of the inspection objective image and a 2×2 pixel cluster $PCL_O$ of the comparison inspection block Ri+m, j+n inputted in the manner described above are held by latch circuits 111 and 112, respectively. Data of a corresponding pixel of these pixel clusters are calculated by exclusive OR (EOR) gates 105. Since outputs of the EOR gates 105 become "1" when the inspection objective image and the reference image in the corresponding pixel do not coincide with each other, in the divided area image selected here, the outputs express a difference image between the inspection objective image and the reference image found using 2×2 pixel clusters.

Outputs from the EOR gates 105 are supplied to an AND gate 106 which is at the next stage. Hence, if the inspection objective image and the reference image are different from each other in all pixels of the 2×2 pixel clusters held here, i.e., if the difference image between the inspection objective image and the reference image includes an area equal to or larger than 2×2 pixels, the AND gate 106 outputs "1."

Figure 5B:
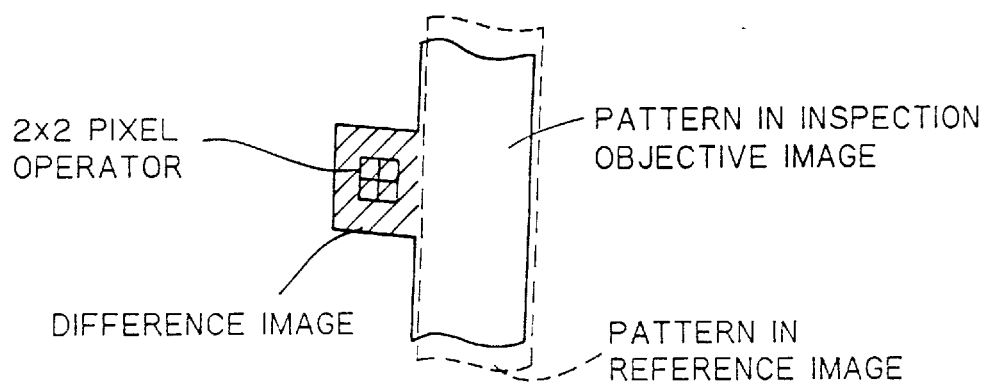

Hence, while serially inputting data of the inspection objective image and the reference image, if a non-coinciding portion equal to or larger than 2×2 pixels is found between the inspection objective image and the reference image, a pattern defect is detected. This corresponds to scanning of the difference image between the inspection objective image and the reference image found using the 2×2 pixel operator and inspecting whether the difference image includes a portion in which the image operator is completely included as shown in FIG. 5B. An output from the AND gate 106 of each comparison inspection block is supplied to a judgement part 104 shown in FIG. 4.

The judgement part 104 includes a register 104R for each divided area and receives a divided area change signal indicating boundaries between the inspection objective divided areas each time the inputted image signal reaches the boundaries between the inspection objective divided areas $SC_{11}$, $SC_{12}$, . . . , $SC_{ij}$, as shown in FIG. 2A. The divided area change signal is generated by a control part 33 (See FIG. 1) in accordance with the size of each inspection objective divided area which is predetermined under rules which will be described later. Every time the divided area change signal calls for a change of divided areas, the register 104R for each divided area changes a cell in which a signal from each comparison inspection block Di+m, j+n is registered, whereby a defect detection is registered in the register 104R for each inspection objective divided area. In accordance with the information latched in the register 104R, the judgement part 104 supplies the detection signal which expresses the existence or the absence of a pattern defect to the output part 34 (See FIG. 1).

3. Determination of Size of Inspection Objective Compartment

Figure 6:
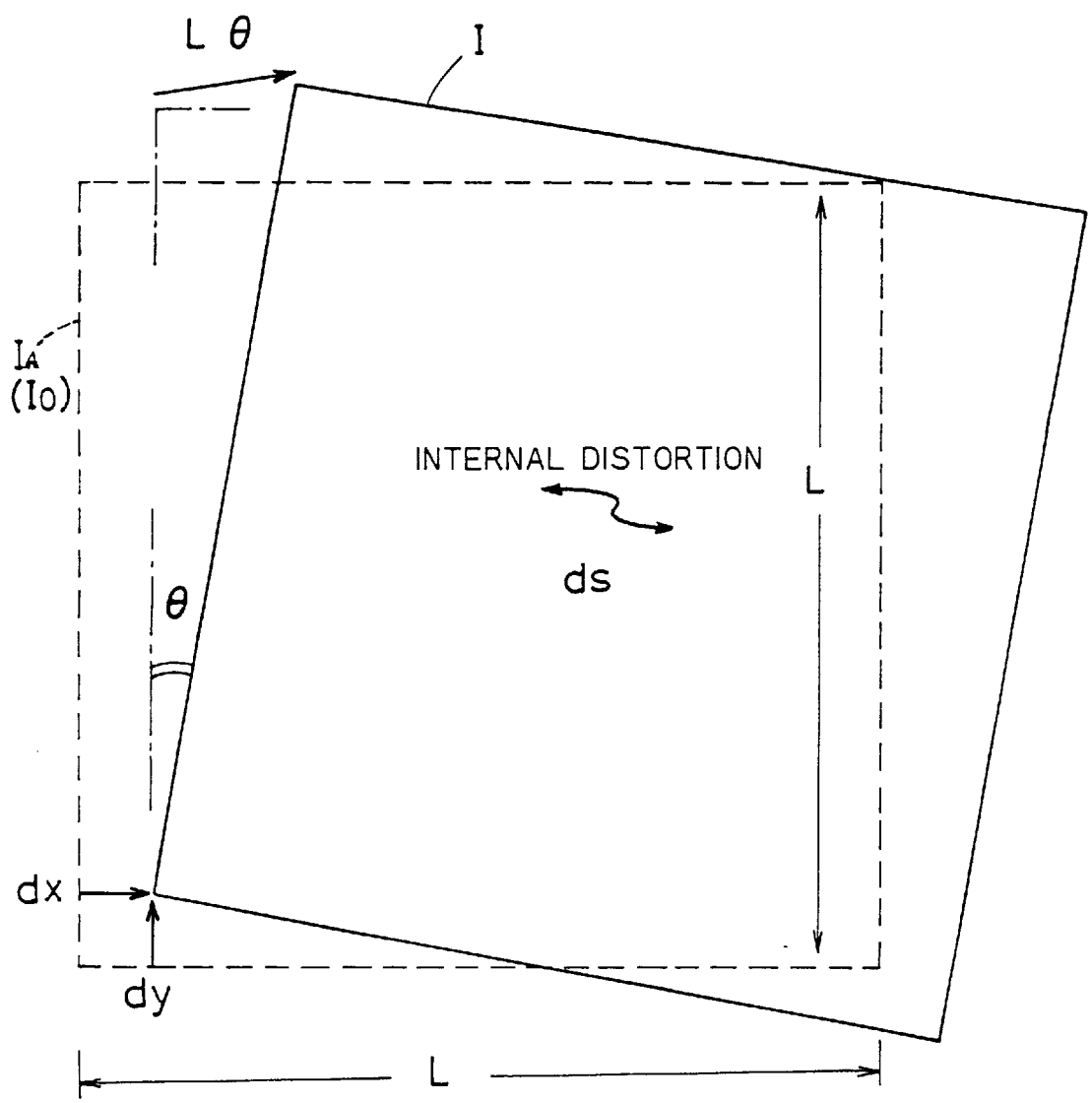
FIG. 6 is a diagram for describing a positional deviation of an inspection objective image.

FIG. 6 is an explanatory diagram for describing principles of determining the size of each inspection objective divided area $SC_{ij}$. FIG. 6 shows the position and the orientation of an inspection objective image $I_A$, which results when the printed substrate 20, having no internal distortion, is placed on the table 21 without any translational deviation, or inclination so that no error is created during image reading, and the position and the orientation of the inspection objective image I which results when there are various positional deviations.

First, a translational deviation includes a deviation dx in the main scanning direction and a deviation dy in the sub scanning direction. With respect to an angle, a deviation of L●sin θ results at the both ends of the inspection objective image I when the inspection objective image I is inclined at an angle θ. However, in reality, since the angle θ is small, the deviation is approximated as L●θ.

Hence, the maximum positional deviation due to these deviations is expressed as:

$$\text{Max (dx, dy, L●θ)} \quad (1)$$

where the symbol "Max ( . . . )" denotes an operation of calculating a maximum allowance value (i.e., expected maximum allowance) for each element and extracting the largest one of calculated maximum allowance values when there are a plurality of elements.

Excluding the translational deviation, the deviation value is expressed as:

$$\text{Max (L●θ)} \quad (2)$$

Another possible cause of the deviation of the inspection objective image I is internal distortion of the printed substrate 20. Assuming that a maximum allowance value (i.e., expected maximum allowance) of the distortion is ds, the sums $D_{MAX}$ and $R_{MAX}$ of the value ds for Eqs. (1) and (2) are respectively:

$$D_{MAX}=ds+Max\ (dx,\ dy,\ L\bullet\theta) \qquad (3)$$

$$R_{MAX}=ds+Max\ (L\bullet\theta) \qquad (4)$$

On the other hand, since the standard pattern image $I_o$ is generated under the assumption that the inspection objective image is not deviated, the standard pattern image $I_o$ is prepared under the assumption that it will be placed at the same position as the ideal inspection objective image $I_A$. However, in reality, the inspection objective image I is likely to be displaced from the standard pattern image $I_o$ by maximum distance $D_{MAX}$.

Now, it should be noted that a portion created due to a translational deviation of the entire inspection objective image among various positional deviations can be absorbed by adjusting the maximum distance by which the reference images are shifted, i.e., the maximum shifting quantity M shown in FIGS. 2A and 2B, because the reference images are compared with the inspection objective image inside of each inspection objective divided area in the divide and sway comparison method. For this reason, it is not necessary to consider a translational positional deviation to determine the size K of each inspection objective divided area $SC_{ij}$ of the inspection objective image. Hence, it is not the distance $D_{MAX}$ but is the distance $R_{MAX}$ which expresses the maximum positional deviation other than a translational deviation that is important in determining the size K of each inspection objective divided area $SC_{ij}$.

Figure 7:
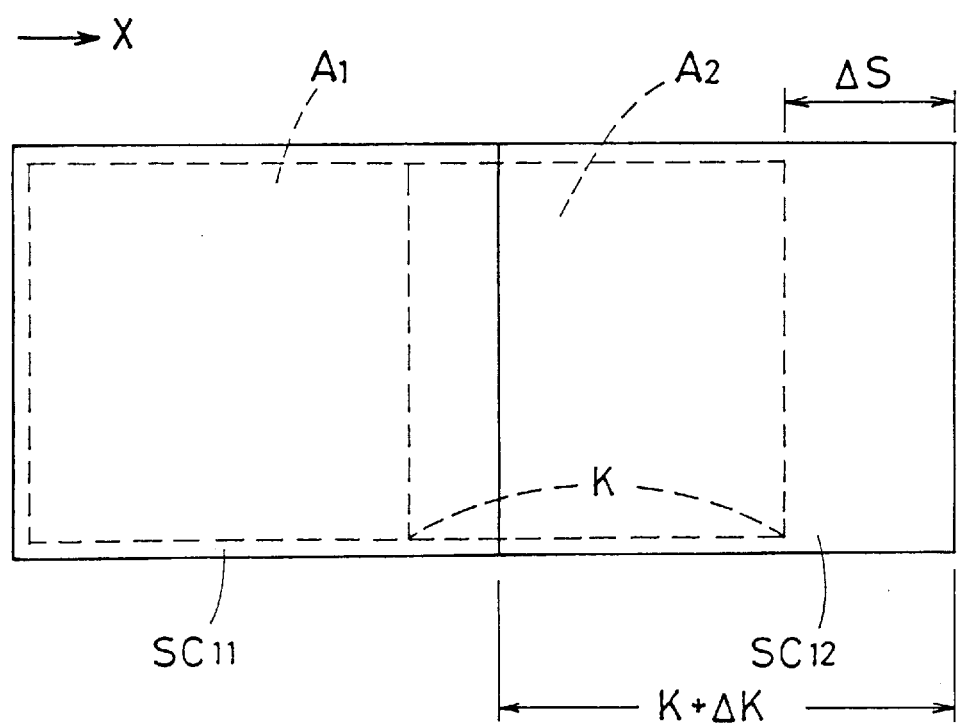
FIG. 7 is a diagram for describing a positional deviation in each inspection objective divided area.

Since the distance $R_{MAX}$ is calculated for the entire inspection objective image I, the maximum value of positional deviations within each inspection objective divided area $SC_{ij}$ is (K/L) times as large as the distance $R_{MAX}$. As stated herein, the "positional deviations within the inspection objective divided area $SC_{ij}$" refers to positional deviations of this particular inspection objective divided area $SC_{ij}$ and does not include an accumulation of positional deviations of precedent inspection objective divided areas. That is, in the case of an extension in the main scanning direction, one type of internal distortion, the inspection objective divided areas $SC_{11}$ and $SC_{12}$, which are adjacent to each other, extend from ideal positions $A_1$ and $A_2$ to the positions denoted by solid lines in FIG. 7. A positional deviation of the inspection objective divided area $SC_{12}$ is not an accumulated deviation $\Delta S$ from the ideal position $A_1$. Rather, the positional deviation of the inspection objective divided area $SC_{12}$ is defined by a $\Delta K$ which is a difference between the length of the inspection objective divided area $SC_{12}$ after it is extended and the original length K of the inspection objective divided area $SC_{12}$. Thus, positional deviations of other inspection objective divided areas need not be considered to find a positional deviation of one inspection objective divided area. This is because an influence of the positional deviations of the other inspection objective divided areas can be absorbed by adjusting the maximum shifting quantity by which the reference images are shifted.

According to the above discussion, the maximum positional deviation $\Delta K$ for each inspection objective divided area is expressed as:

$$\Delta K = (K/L)\ R_{MAX}$$
$$= (K/L)\ \{ds + Max\ (L\bullet\Theta)\} \qquad \ldots (5)$$

If the maximum positional deviation $\Delta K$ for each inspection objective divided area is larger than the size of 1 pixel (i.e., pixel pitch p), when the image portion of the inspection objective divided area is extracted from the inspection objective image, a deviation equal to or larger than 1 pixel is created at the both ends of the image portion (as compared with where there is no positional deviation), which in turn prohibits accurate comparison by the divide and sway comparison method. To deal with this, in accordance with the principles of the present invention, an additional conditions is used which requires the maximum positional deviation $\Delta K$ to be smaller than the pixel pitch p:

$$\Delta K \leq p$$

Hence, from Eqs. 5 and 6, $$(K/L)\ \{ds+Max\ (L\bullet\theta)\} \leq p \qquad (7)$$

Modifying Eq. 7, $$K \leq pL/\{ds+Max\ (L\bullet\theta)\}$$

that is, $$K \leq pL/R_{MAX} \qquad (8)$$

In short, the maximum allowance value $R_{MAX}$ of positional deviations other than a translational deviation is determined considering the nature of the object to be inspected. The size K of each inspection objective divided area is determined to satisfy the condition of Eq. 8, taking into consideration the size L of the inspection objective image I (i.e., the objective to be inspected) and the pixel pitch p.

Preferably, $$\Delta K << p \qquad (9)$$

Modified as, $$K << pL/\{ds+Max\ (L\bullet\theta)\}$$

that is, $$K << pL/R_{MAX} \qquad (10)$$

A desirable range is:
$$K \leq (\tfrac{1}{2})pL/\{ds+Max\ (L\bullet\theta)\}$$

that is, $$K \leq (\tfrac{1}{2})pL/R_{Max} \qquad (11)$$

Further preferably, $$K \leq (\tfrac{1}{4})pL/\{ds+Max\ (L\bullet\theta)\}$$

that is, $$K \leq (\tfrac{1}{4})pL/R_{Max} \qquad (12)$$

Figure 9A:
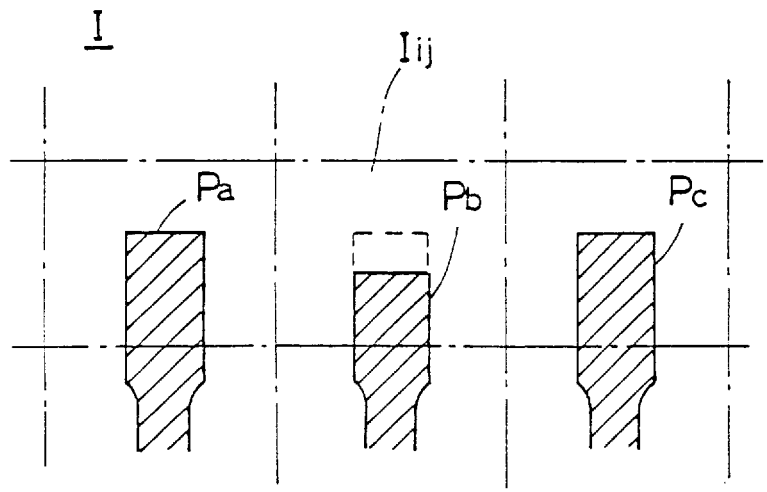
FIGS. 9A and 9B are diagrams describing a problem which is created when the size of an inspection objective divided area is too small.
Figure 9B:
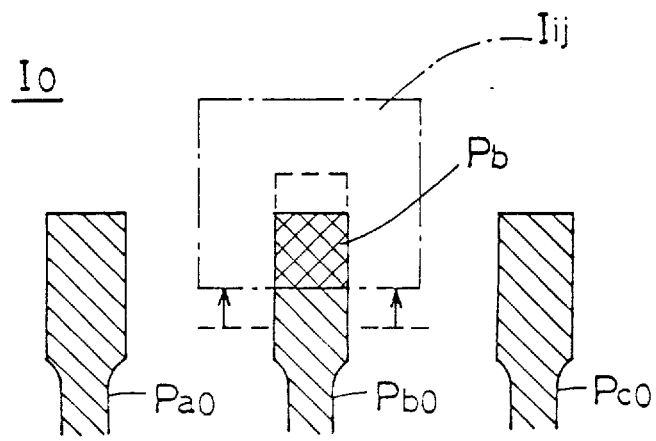

The upper limit of the size K of each inspection objective divided area is determined in this manner in the present embodiment. The lower limit of the size K may be determined to satisfy other conditions depending on need. For instance, to avoid the situation described in reference with FIGS. 9A and 9B, the following condition should be satisfied:

$$K \leq K_{MIN} \qquad (13)$$

where $K_{MIN}$ is the minimum size of a portion which is to be compared and inspected among the inspection objective patterns at once.

For example, $K_{MIN}=(1/8)L$, $(1/16)L$. To ensure that the entire inspection objective image is covered with a plurality of inspection objective divided areas, the number K is preferably selected to satisfy:

$$K=(1/K_N)L \qquad (14)$$

where $K_N$ is an integer larger than 1.

4. Determination of Maximum Shifting Quantity M of Reference Image

On the other hand, the maximum shifting quantity M of the reference images (See. FIG. 2B) is determined using the maximum value $D_{MAX}$, which is associated with a positional deviation also including a translational deviation. Thus, since each inspection objective divided area may be displaced within a range having the maximum value $D_{MAX}$, as compared with an ideal orientation, the maximum shifting quantity M of the reference images is set equal to or larger than the maximum value $D_{MAX}$. In other words, the maximum shifting quantity M is determined to satisfy:

$$M \geq D_{MAX}$$

that is, $$M \geq ds + Max\ (dx, dy, L \odot \theta) \qquad (15)$$

Converting the maximum shifting quantity M into the number of pixels MPX, $$M = M_{PX} \bullet p \qquad (16)$$

This condition is written as:

$$M_{PX} \geq (1/p)\ D_{MAX}$$

that is, $$M_{PX} \geq (1/p)\{ds + Max\ (dx, dy, L \bullet \theta)\} \qquad (17)$$

When the above condition is represented in terms of a value $D_{MAX2}$, which considers the right and the left directions (or the upward or the downward directions) instead of the positional deviation maximum value $D_{MAX}$, $$M_{PX} \leq (1/2p)\ D_{MAX2}$$

that is, $$M_{PX} \leq (1/p)\{ds + Max\ (dx, dy, L \bullet \theta)\} \qquad (18)$$

The upper limit of the maximum shifting quantity M of the reference images is not particularly limited. However, if the upper limit is too large, the comparison circuit becomes complex and the processing speed slows down. To avoid this situation, the upper limit is determined as twice the lower limit described above.

The size K of each inspection objective divided area and the maximum shifting quantity M of the reference images are determined in accordance with the criteria noted above for the present embodiment. Performing comparison inspection from these values using the circuit structure noted above, an affect of a positional deviation of the inspection objective image as a whole is substantially obviated, making it possible to accurately perform comparison inspection on the printed substrate 20.

5. Example of Values

The size K of each inspection objective divided area and the maximum shifting quantity M of the reference images are determined in accordance with the criteria noted above. For example, in the case where the following conditions are satisfied:

L=500 mm p=16 μm $D_{MAX}$=300 μm ($D_{MAX2}$=600 μm)

$R_{MAX}$=150 μm  (19)

the following relationship results:

$K \leq a \times 16\ \mu m \times 500\ mm/150\ \mu m = 5.3 \times a(cm)$  (20)

where a is a constant satisfying a=1, (½) or (¼), and the further relationship follows:

$M_{PX} \geq (1/16\ \mu m) \times 300\ \mu m = 18.75$

Since the number of pixels $M_{PX}$ is inherently an integer, in reality, $M_{PX} \geq 19$ pixels In accordance with this condition, in the present embodiment, the values are set as:

K=2.0 cm $M_{PX}$=20 pixels (M=16 μm×20=320 μm (21)

6. Modification

Although the inspection objective image is a square having a size L×L and the inspection objective divided area is also a square having a size K×K, both the inspection objective image and the inspection objective divided area may be a rectangle.

If the positional deviation maximum values $R_{MAX}$ and $D_{MAX}$ are approximately the same in the vertical and the horizontal directions, the equations defining the size K of the inspection objective divided areas are used to define a size $K_X$ in the main scanning direction and a size $K_Y$ in the sub scanning direction. The equations may also be used to define a maximum shifting quantity $M_X$ in the main scanning direction and a maximum shifting quantity $M_Y$ in the sub scanning direction of the reference images.

Where the positional deviation maximum values $R_{MAX}$ and $D_{MAX}$ are likely to be substantially different from each other in the vertical and the horizontal directions, maximum values $R_{MAX-X}$, $R_{MAX-Y}$, $D_{MAX-Y}$ and $D_{MAX-Y}$ in the vertical and the horizontal directions need to be determined. The equations defining these conditions are determined for each one of the vertical and the horizontal directions in accordance with the maximum values $R_{MAX-X}$, $R_{MAX-Y}$, $D_{MAX-X}$ and $D_{MAX-Y}$. In accordance with these equations, the sizes $K_X$ and $K_Y$ of the inspection objective divided areas and the maximum shifting quantities $M_X$ and $M_Y$ in the main scanning direction X and the sub scanning direction Y are then determined.

In the embodiment above, the two types of positional deviation maximum values $R_{MAX}$ and $D_{MAX}$ are set, with the former determining the size of the inspection objective divided areas and the latter determining the maximum shifting quantities of the reference images. However, when a translational deviation of the inspection objective image as a whole can be ignored, the values $R_{MAX}$ and $D_{MAX}$ are the same. Hence, to use the two types of positional deviation maximum values is not essential. Rather, a common maximum value may be used depending on the situation.

Although the embodiment above is related to comparison inspection using a 2×2 pixel operator, the present invention is applicable to the divide and sway comparison method in general. A specific procedure of comparison inspection is not limited to the description above.

The present invention is applicable not only to an inspection apparatus for inspecting a printed substrate but also to pattern inspection of an IC mask pattern, a lead frame and a liquid crystal display substrate. Further, although application to a two-dimensional image is a typical application, the present invention is also applicable to comparison and inspection of one-dimensional picture data and three-dimensional picture data which is obtained by combining a plurality of cross sectional images taken at different positions by a computer tomograph machine.

While the invention has been described in detail, the foregoing description is in all aspects illustrative and not restrictive. It is understood that numerous other modifications and variations can be devised without departing from the scope of the invention.

I claim:

1. A method for detecting a defect of an objective image by comparing said objective image with a reference image, comprising the steps of:
   a) determining maximum whole deviation of said objective image from said reference image;
   b) dividing said objective image into a plurality of divided images;
   c) determining a part of said reference image corresponding to each divided image;
   d) determining a plurality of reference partial images around said part of said reference image; and
   e) comparing each divided image with said plurality of reference partial images to detect said defect of said objective image,
   wherein positional maximum intra-deviations within each divided image corresponding to said maximum whole deviation of said objective image are no larger than a pixel of said objective image, and
   said plurality of reference partial images are distributed from said part of said reference image over a distribution width not less than said maximum whole deviation of said objective image.

2. The method of claim 1, wherein
   the step b) includes the steps of:
   b-1) designating a minimum threshold size of each divided image; and
   b-2) determining each size of said plurality of divided images being no less than said minimum threshold size.

3. The method of claim 2, wherein
   said plurality of divided images have a common size.

4. The method of claim 3, wherein
   said distribution width of said plurality of reference partial images are twice said maximum whole deviation of said objective image.

5. The method of claim 1, wherein
   the step a) includes the steps of:
   a-1) determining maximum non-translational deviation of said objective image from said reference image, and
   a-2) determining maximum total deviation of said objective image from said reference image including translational deviation and non-translational deviation,
   said positional maximum intra-deviations within each divided image are determined as a function of said maximum non-translational deviation of said objective image, and
   said distribution width of said plurality of reference partial images is not less than said maximum total deviation of said objective image.

6. An apparatus for detecting a defect of an objective image by comparing said objective image with a reference image, comprising:
   a) dividing means dividing said objective image into a plurality of divided images;
   b) first determining means determining a part of said reference image corresponding to each divided image;
   c) second determining means determining a plurality of reference partial images around said part of said reference image; and
   d) comparator means comparing each divided image with said plurality of reference partial images to detect said defect of said objective image,
   wherein maximum whole deviation of said objective image from said reference image being predetermined,
   positional maximum intra-deviations within each divided image corresponding to said maximum whole deviation of said objective image are no larger than a pixel of said objective image, and
   said plurality of reference partial images are distributed from said part of said reference image over a distribution width not less than said maximum whole deviation of said objective image.

7. The apparatus of claim 6, wherein
   a minimum threshold size of each divided image is determined; and
   each size of said plurality of divided images is no less than said minimum threshold size.

8. The apparatus of claim 7, wherein
   said plurality of divided images have a common size.

9. The apparatus of claim 8, wherein
   said distribution width of said plurality of reference partial images are twice said maximum whole deviation of said objective image.

10. The apparatus of claim 6, wherein
    maximum non-translational deviation of said objective image from said reference image is determined,
    maximum total deviation of said objective image from said reference image including translational deviation and non-translational deviations is also determined,
    said positional maximum intra-deviations within each divided image are determined as a function of said maximum non-translational deviation of said objective image, and
    said distribution width of said plurality of reference partial images is not less than said maximum total deviation of said objective image.

* * * * *